United States Patent [19]

Sears, Jr. et al.

[11] 3,740,801

[45] June 26, 1973

[54] RETENTION OF PRESSURE LINE TO WELL TUBING

[75] Inventors: Edgar A. Sears, Jr., Whittier; Harry M. Taylor, Laguna Hills, both of Calif.

[73] Assignee: Hydril Company, Los Angeles, Calif.

[22] Filed: Aug. 23, 1971

[21] Appl. No.: 173,997

[52] U.S. Cl. ............ 24/81 CC, 24/262 R, 138/111, 248/74 R, 285/137 R, 285/373, 285/45
[51] Int. Cl. .............................................. F16l 3/22
[58] Field of Search ................... 285/137 R, 137 A, 285/188, 373, 41, 45; 166/72, 315; 138/112, 113, 111, 99, 107; 251/58; 248/74 R, 68; 24/81 CC, 73 CC, 262 R

[56] References Cited
UNITED STATES PATENTS 2,858,093  10/1958  Knoll ........................... 24/81 CC X
2,396,925  3/1946  Morehouse .................. 248/74 R X
470,698  3/1892  Murdock ......................... 248/74 R Primary Examiner—Thomas F. Callaghan
Attorney—White, Haefliger & Bachand

[57]  ABSTRACT

The invention concerns coupling of a control pressure line to larger diameter well tubing, as by a coupling comprising:
a. a C-shaped metallic retainer body adapted for lateral connection about the tubing,
b. said body forming a longitudinally extending recess,
c. elastomer means at the inner side of the retainer body for reception in said recess to be compressed between the body and the line in response to said lateral connection of the retainer body about the tubing.

8 Claims, 5 Drawing Figures 3,740,801
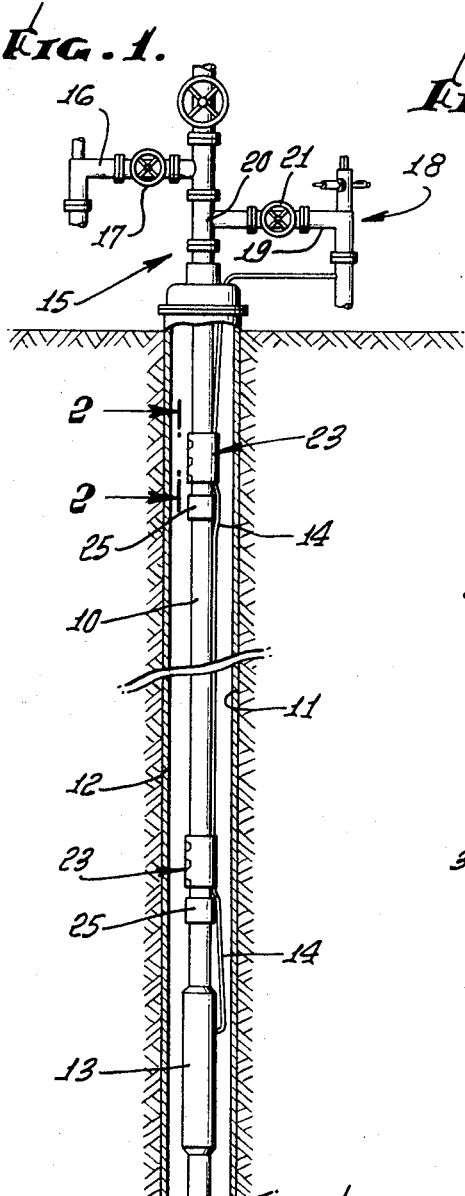
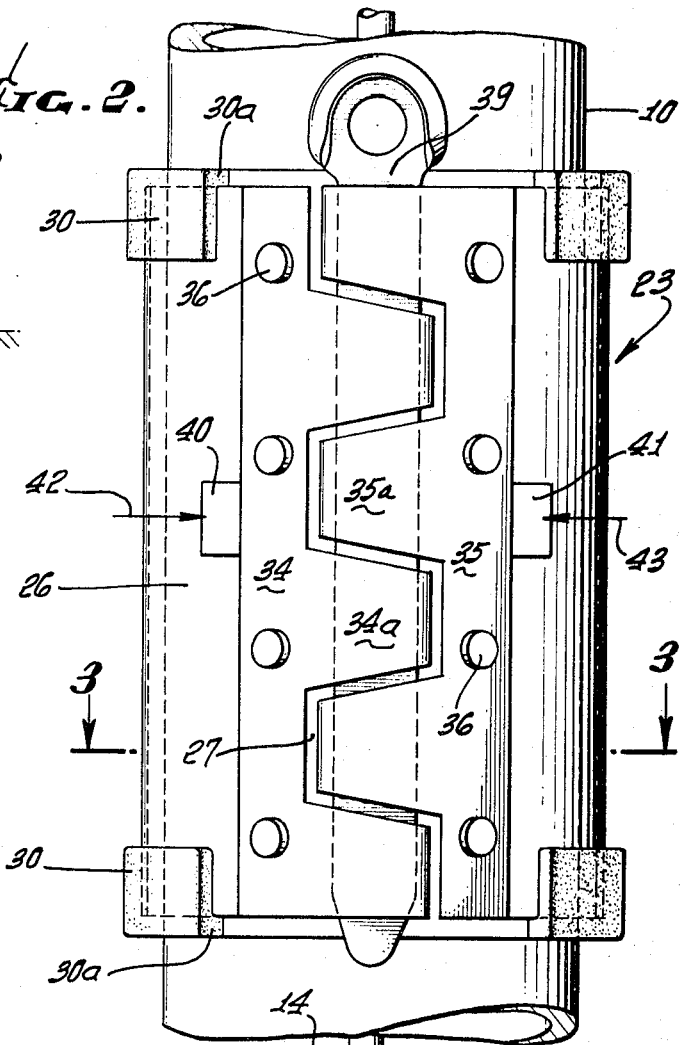
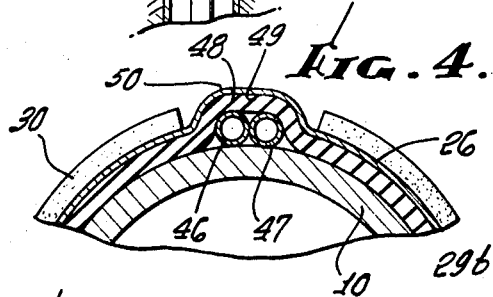
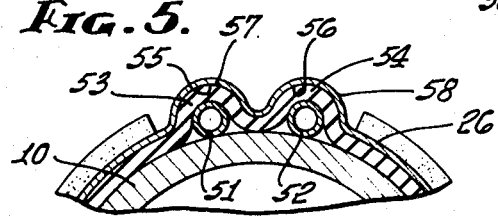
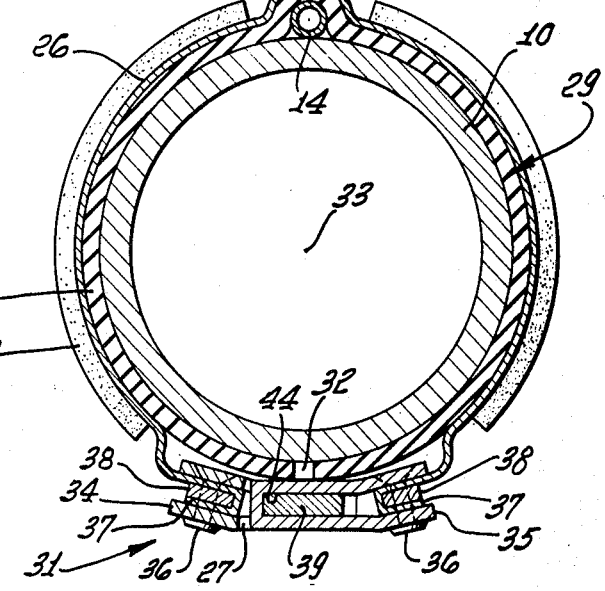

RETENTION OF PRESSURE LINE TO WELL TUBING

BACKGROUND OF THE INVENTION

This invention relates generally to pipe couplings, and more particularly concerns the coupling to well tubing of smaller control lines extending to sub-surface valves.

Such control lines are commonly formed to extend adjacent well tubing as the latter is run into a well. It is desirable that the lines be retained closely adjacent the tubing so that they do not become severly damaged during running of the tubing into or out of the hole. However, no way was known, prior to the present invention, to provide progressive, positive, protective and rapid coupling of such lines to well tubing, with the unusual advantages in structure, function and result as now afforded by the invention.

SUMMARY OF THE INVENTION

It is a major object of the invention to provide apparatus for positively and rapidly coupling a control pressure line to well tubing, the apparatus basically comprising:

a. a C-shaped metallic retainer body adapted for lateral connection about the tubing,
b. said body forming a longitudinally extending recess, and
c. elastomer means at the inner side of the retainer body for reception in said recess to be compressed between the body and the line in response to said lateral connection of the retainer body about the tubing.

As will be seen, latch terminals are typically provided on the retainer body and spaced from the recess, the terminals adapted to be interconnected at the side of the tubing generally opposite the retained control line. Such terminals may be formed by latch strips which are attached to body edge portions proximate the body lengthwise split, the strips standing out radially from the cylindrical locus of the body to receive coupling force application.

Further, the elastomer means may comprise a rubber sheet lining the inner side of the body, and extending in the recess to be stretched for holding the line against the tubing; and the elastomer means may include rubber lips located at the retainer body exterior at opposite ends thereof, as will be seen.

These and other objects and advantages of the invention, as well as the details of illustrative embodiments, will be more fully understood from the following description and drawings, in which:

DRAWING DESCRIPTION

FIG. 1 is an elevation showing the environment of the invention;

FIG. 2 is an elevation showing a pressure line retainer coupled to well tubing;

FIG. 3 is a section taken on line 3—3 of FIG. 2;

FIG. 4 is a fragmentary section, similar to FIG. 3, and showing a modified retainer; and FIG. 5 is a fragmentary section, like that of FIG. 4, illustrating another modified retainer.

DETAILED DESCRIPTION

In FIG. 1, well tubing 10 extends in a well 11 cased at 12, there being a surface controlled, sub-surface valve unit 13 connected in series with the tubing. Merely as illustrative, U. S. Pat. No. 3,035,808 describes one such sub-surface valve unit, it being understood that there are many forms of such valves. The function of the latter is to control the upward flow of well fluid in tubing such as 10, pursuant to the presence or absence of sufficient control pressure application in a small control line 14 extending from the surface alongside the tubing to the valve location. Typically, in the presence of such control pressure transmission, the valve unit remains open to pass well fluid to suitable well head equipment 15 that includes a production line 16 which is valve controlled at 17; however, should sufficient control pressure fail to be transmitted, inadvertently or otherwise, the valve unit will close, providing for positive shut off of well production. A control pressure supply means is shown at 18, and may be connected by line 19 to the well head casing 20 that receives the production flow, to use the pressure of such fluid in the generation of control fluid pressure. Accordingly, if surface valve 21 in line 19 is open, pressure is supplied to the sub-surface valve to keep it open, whereas if valve 21 is closed, the sub-surface valve will close. These considerations apply to one unusually advantageous application of the invention, there also being other applications.

FIG. 1 also illustrates the use of apparatus for connecting the control pressure line 14 to the relatively larger diameter well tubing, such retention apparatus taking the form of coupler units generally designated at 23. The latter may be coupled to the tubing at locations, as shown, just above the joints 25 that interconnect the individual tubing lengths or stands, so as to minimize the time required for running the tubing into and out of the hole. It will be understood that the smaller control line 14 is also typically made up by end-interconnecting sections thereof, using threaded couplers, as the tubing is run into the hole.

Extending the description to FIGS. 2 and 3, the coupler 23 includes a C-shaped, metallic retainer body 26, for example in the form of a general longitudinally split sleeve, adapted for lateral connection about the longitudinally extending tubing. The body may typically be relatively thin walled to facilitate lateral spreading thereof as the tubing is passed through the opened split 27, the body then resiliently returning to a collapsed condition about the tubing.

Further, the body forms a longitudinally extending recess, as for example at 28, and elastomer means extends at the innerside of the body for reception in the recess to be compressed between the body and the line 14 in response to lateral connection of the retainer body about the tubing. In the FIG. 3 example, the recess 28 is generally semicircular, and the elastomer means may comprise a rubber liner or sheet 29 of uniform thickness, and having extent 29a compressed between the line 14 and the outwardly bulged extent 26a of the body 26 that forms recess 28. As a result, control line 14 is held firmly against the tubing. Note also the main liner extent 29b of the sheet 29 that extends about and is compressed against the tubing by the body 26.

The sheet may be naturally unbulged at 29a, so as to extend generally circularly across, but not within, the recess 28 prior to application of the coupler to well tubing. Accordingly, the sheet extent 29a becomes stretched into the recess by the line 14, whereby retention of the line against the tubing is enhanced by the tension developed in the stretched rubber.

The rubber sheet or liner 29 may be unbonded to the body 26, but retained in position as by means of rubber lips 30 projecting at opposite ends of the sheet and exteriorly of the body for protecting the body against direct engagement with casing 12. Such lips are connected with or join the main extent of the sheet 29 at end locations 30a overlapping the ends of the body 26, and the lips are seen to be circularly interrupted in FIG. 3 by the bulge 26a, and by latch means generally indicated at 31, these being at generally diametrically opposite locations. The sheet or liner 29 is split lengthwise, at location 32, to pass the tubing laterally during application of the coupler to tubing.

Such latch structure includes latch terminals on the body, these being spaced from recess 28 and generally staggered lengthwise of axis 33 so as to be interconnected at the side of the tubing opposite line 14. For example, latch strips 34 and 35 may be riveted at 36 to turned back opposite edge portions 37 of the body, there being spacers 38 retained adjacent such edge portions to pass the rivets. The latch terminals may be formed at 34a and 35a on the latch strips, terminals 34a spaced longitudinally and staggered relative to longitudinally spaced terminals 35a. Further, the terminals are looped, as shown, to pass a latch or key 39 when the loops are brought into registration. For this purpose, a coupling tool may have jaws indicated at 40 and 41 in FIG. 2 to receive lateral force application at 42 and 43 applied against the strips 34 and 35 standing out from the cylindrical locus of the body 26. Removable key 39 extends longitudinally through the loops 44 formed by the terminals.

FIG. 4 shows another form of the invention wherein a pair of control pressure lines 46 and 47 leading, for example, to two sub-surface valves, are retained adjacent one another, and by rubber liner 48. The latter is resiliently deflected into recess 49 formed by coupler body bulge 50. In FIG. 5, two such control lines 51 and 52 are spaced apart, and retained against the tubing 10 by liner extents 53 and 54. The latter are resiliently deflected into recesses 55 and 56 formed by coupler body bulges 57 and 58.

I claim:

1. In apparatus for coupling a control pressure line to relatively substantially larger diameter well tubing that extends longitudinally, the combination comprising:
    a. a C-shaped metallic retainer body adapted for lateral connection about the tubing,
    b. said body forming a longitudinally extending local recess at the inner side of the body,
    c. resilient elastomer means at the inner side of the retainer body and bridging the recess at the inner side thereof to be stretchably deflected outwardly toward the interior of the recess by the line and in response to said lateral connection of the retainer body about the tubing, whereby the elastomer means will resiliently urge the line toward the tubing,
    d. the body metal being of generally uniform thickness and bulging outwardly and locally to form said recess, and latch terminals on the retainer body and spaced from said recess and adapted to be interconnected at the side of the tubing opposite said recess.

2. The combination of claim 1 including said tubing and line, the elastomer means stretched in the recess to urge the line against the tubing.

3. The combination of claim 1 wherein said elastomer means comprises a rubber sheet extending in lining relation at the inner side of the retainer and within the recess from loci proximate said terminals.

4. The combination of claim 1 including protective elastomer structure extending at the exterior of the metallic retainer and connected thereto.

5. The combination of claim 3 including rubber lips connected to said sheet and located at the exterior of the retainer proximate longitudinally opposite ends thereof.

6. The combination of claim 1 wherein said recess is sized to pass another line paralleling the first mentioned line.

7. The combination of claim 6 including said other line.

8. The combination of claim 1 wherein latch strips are attached to body edge portions proximate a split formed thereby, the latch terminals formed by the strips which stand out radially from a generally cylindrical locus defined by the body to receive coupling force application.

* * * * *